United States Patent Office 3,499,897
Patented Mar. 10, 1970

3,499,897
1,4-DIHYDRO-4-OXO-2-QUINAZOLINEPROPIONIC ACID ESTERS
Stanley C. Bell, Penn Valley, and Peter H. L. Wei, Upper Darby, Pa., assignors to American Home Products Corporation, New York, N.Y., a corporation of Delaware
No Drawing. Filed Dec. 8, 1967, Ser. No. 688,984
Int. Cl. C07d 51/48
U.S. Cl. 260—251                 4 Claims

ABSTRACT OF THE DISCLOSURE

This invention concerns esters of 1,4-dihydro-4-oxo-2-quinazolinepropionic acids which are pharmacologically active as mydriatic agents.

---

This invention relates to new and novel esters of quinazolinepropionic acids. In particular, this invention is concerned with 1,4-dihydro-4-oxo-2-quinazolinepropionic acid esters which have mydriatic properties when tested under standard and acceptable pharmacological procedures. They are, therefore, deemed to possess utility in experimental and comparative pharmacology.

The new and novel compounds within the purview of the present invention are illustrated by the following formula:

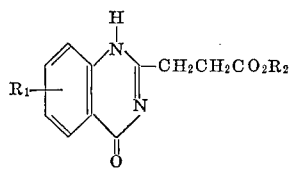

wherein $R_1$ is selected from the group consisting of hydrogen, halogen, lower alkyl and lower alkoxy; and $R_2$ is lower alkyl. As employed herein the terms "lower alkyl" and "lower alkoxy" are meant to include both straight and branched chain moieties having from about one to about eight carbon atoms. Typical examples thereof are: 6-chloro-1,4-dihydro-4-oxo-2-quinazolinepropionic acid, ethyl ester; 1,4-dihydro-7-methyl-4-oxo-2-quinazolinepropionic acid, ethyl ester; and 1,4-dihydro-6-methoxy-4-oxo-2-quinazolinepropionic acid, propyl ester. Although the compounds of this invention have been designated as 1,4-dihydro-4-oxo-2-quinazolinepropionic acids, it should be recognized that they also exist in their tautomeric form as 3,4-dihydro-4-oxo-2-quinazolinepropionic acids.

The compounds of the present invention are synthesized by the new and novel process which is hereafter schematically illustrated:

wherein $R_1$ is defined as above, X is halogen and R and $R_2$ are lower alkyl. The reaction is effected by contacting an appropriate 2'-carbalkoxy-3-halopropionanilide (I) with an alkali metal cyanide, e.g., sodium and potassium cyanide, and a lower alkanol at a temperature range from about 60° C. to about reflux temperatures for a period of about ten to about twenty-four hours. Preferably this reaction is conducted with potassium cyanide at reflux temperatures for a period of about twelve hours.

When the reaction is complete, the resulting 1,4-dihydro-4-oxo-2-quinazolinepropionic acid ester (IV) is separated by standard recovery procedures. For example, the reaction mixture is filtered and the collected solid is recrystallized from a suitable solvent, e.g., an alkanol, acetonitrile and chloroform. Compound (II), a 2'-carbalkoxy-3-cyanopropionanilide, is an intermediate in the preparation of the compounds of this invention which may be separated from the mother liquor of the reaction mixture by the procedure exemplified in Example II, while the compound (III) as depicted in the above reaction scheme is a postulated intermediate which has not been isolated but is herein included to elucidate the reaction mechanism of the above described process.

The 2'-carbalkoxy-3-halopropionanilide (I) starting compounds employed in the above described reaction may be prepared by standard organic procedures well known to those skilled in the art of chemistry. For example, these compounds may be prepared by reacting a 2-anthranilate with a 3-halopropionyl halide.

The new and novel 1,4-dihydro-4-oxo-2-quinazolinepropionic acid esters of the present invention possess valuable pharmacological activity. In particular, these compounds in standard pharmacological procedures demonstrate mydriatic activity and are useful as mydriatic agents. Because of this property they are of importance in experimental and comparative pharmacology.

In the pharmacological evaluation of the mydriatic compounds of this invention the in vivo effects of the compounds of this invention are tested as follows:

The compound is administered orally to the three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and automatic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate method" [Nathan B. Eddy and Dorothy Leimbach, J. Phar-

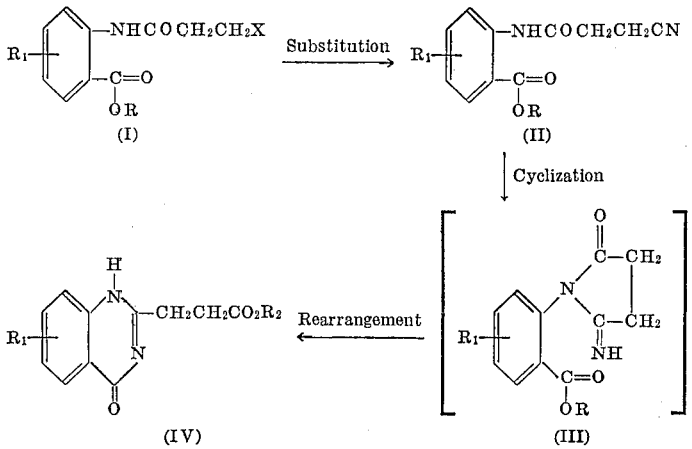

macol. Exper. Therap. 107, 385 (1953)] is used to test for analgesia. The experiment is terminated by subjecting each animal to a maximal electroshock to test for anti-convulsant activity.

The compounds of this invention in the above test procedure are autonomically active and produce mydriasis when orally administered at a concentration of 127 mg./kg.

The following examples are given by way of illustration.

EXAMPLE I

A solution of 23.6 g. of 2'-carbethoxy-3,4'-dichloropropionanilide and 5.9 g. of potassium cyanide in 200 ml. of 95 percent ethanol is heated to reflux overnight. The solid is collected (7.6 g.) which is recrystallized from dimethoxy-ethane to afford 6-chloro-1,4-dihydro-4-oxo-2-quinazolinepropionic acid, ethyl ester, M.P. 227–229° C.

Analysis.—Calc'd. for $C_{13}H_{13}ClN_2O_3$ (percent): C, 55.62; H, 4.67; Cl, 12.63; N, 9.98. Found (percent): C, 55.49; H, 4.66; Cl, 12.7; N, 9.83.

Similarly, 7-bromo-1,4-dihydro-4-oxo-2-quinazolinepropionic acid, methyl ester and 6-fluoro-1,4-dihydro-4-oxo-2-quinazolinepropionic acid, propyl ester are also synthesized.

EXAMPLE II

The solvent from the mother liquor of Example I is removed and the residue is first washed with water and a small amount of ethanol and finally recrystallized twice from cyclohexane to give 2'-carbethoxy-4'-chloro-3-cyanopropionanilide with a melting point of 118–20° C.

Analysis.—Calc'd. for $C_{13}H_{13}ClN_2O_3$ (percent): C, 55.62; H, 4.67; Cl, 12.63; N, 9.98. Found (percent): C, 55.77; H, 4.32; Cl, 12.4; N, 9.83.

EXAMPLE III

A solution of 2'-carbethoxy-3-chloro-5'-methyl propionanilide (0.08 m.) and potassium cyanide (0.09 m.) in 200 ml. of 95 percent ethanol is heated to reflux for twelve hours. The solid is collected and recrystallized from dimethoxyethane to afford 1,4-dihydro-7-methyl-4-oxo-2-quinazolinepropionic acid, ethyl ester.

In like manner, 6-ethyl-1,4-dihydro-4-oxo-2-quinazolinepropionic acid, methyl ester; 5-butyl-1,4-dihydro-4-oxo-2-quinazolinepropionic acid, butyl ester; and 1,4-dihydro-8-methyl-4-oxo-2-quinazolinepropionic acid, methyl ester are prepared.

EXAMPLE IV

A solution of 2'-carbethoxy-3-chloro-4'-methoxy propionanilide (0.16 m.) and sodium cyanide (0.18 m.) in 400 ml. of propanol is heated to 80° C. for twenty-four hours. The solid is collected and then recrystallized from acetonitrile to afford 1,4-dihydro-6-methoxy-4-oxo-2-quinazolinepropionic acid, propyl ester.

In the same manner, 7-ethoxy-1,4-dihydro-4-oxo-2-quinazolinepropionic acid, methyl ester and 6-butoxy-1,4-dihydro-4-oxo-2-quinazolinepropionic acid, ethyl ester are produced.

EXAMPLE V

A solution of 2'-carbethoxy-3-bromo propionanilide (0.32 m.) and potassium cyanide (0.36 m.) in 800 ml. of methanol is heated to 60° C. for twenty-four hours. The resulting solid is collected and recrystallized from chloroform to afford 1,4-dihydro-4-oxo-2-quinazolinepropionic acid, methyl ester.

What is claimed is:
1. A compound having the formula:

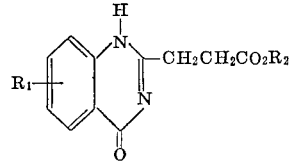

wherein $R_1$ is selected from the group consisting of chloro, bromo and fluoro and $R_2$ is lower alkyl.

2. A compound as described in claim 1 which is: 6-chloro - 1,4 - dihydro-4-oxo-2-quinazolinepropionic acid, ethyl ester.

3. A process for the preparation of compounds having the formula:

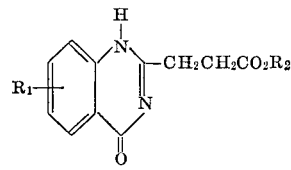

wherein $R_1$ is selected from the group consisting of hydrogen, halogen, lower alkyl and lower alkoxy; and $R_2$ is lower alkyl; which comprises reacting a compound of the formula:

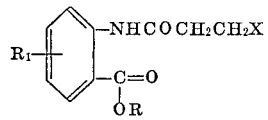

wherein $R_1$ is defined as above and R is lower alkyl and X is halogen with an alkali metal cyanide and an alkanol of the formula:

$$R_2OH$$

wherein $R_2$ is defined as above, at a temperature range from about 60° C. to about reflux temperatures for a period from about ten to about twenty-four hours.

4. A process as described in claim 3 wherein the alkali metal cyanide is potassium cyanide.

References Cited

Bedi et al.: C.A. 30, 6375[6] (1936).
Yanai et al: C.A. 64, 11209b (1966).
Kreicherga et al.: C.A. 65, 16914a (1966).

ALEX MAZEL, Primary Examiner
R. V. RUSH, Assistant Examiner

U.S. Cl. X.R.
260—999, 309.7